May 17, 1955

E. E. SALOUM 2,708,521

STACKED DISC TYPE FLUID FILTER

Filed June 14, 1954

INVENTOR.
EDWARD E. SALOUM
BY
Frank N. Harmon
ATTORNEY

May 17, 1955 E. E. SALOUM 2,708,521
STACKED DISC TYPE FLUID FILTER
Filed June 14, 1954
2 Sheets-Sheet 2
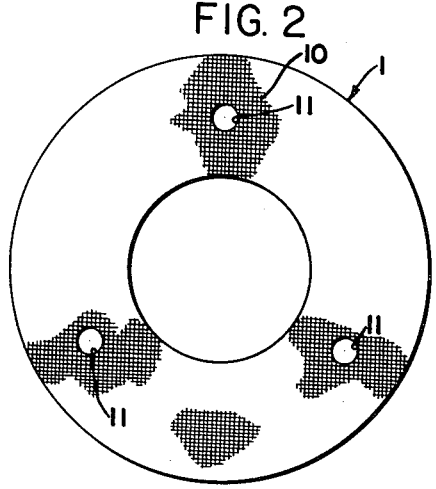
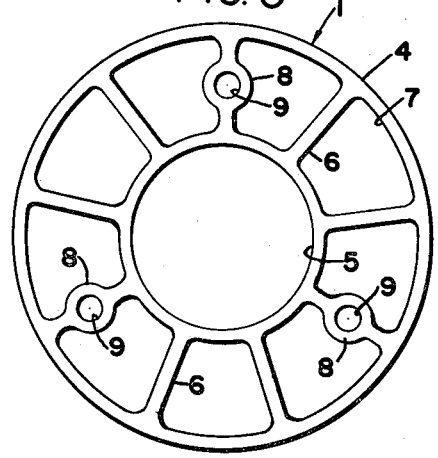
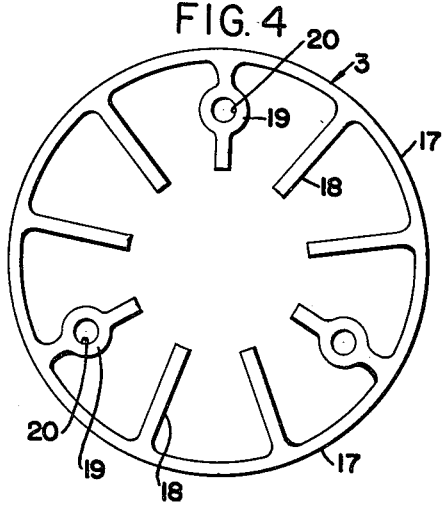
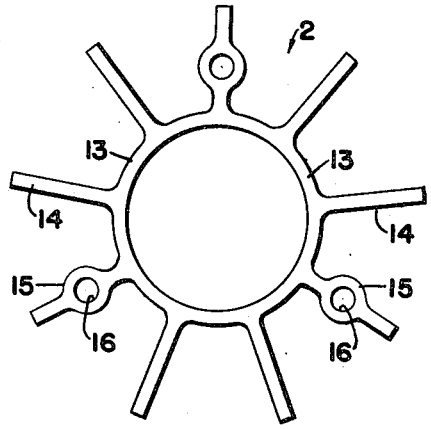
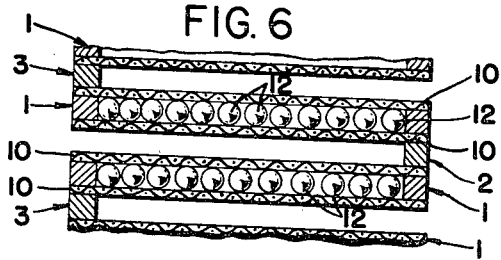
*INVENTOR.*
EDWARD E. SALOUM
*BY*
Frank H. Harmon
ATTORNEY

United States Patent Office 2,708,521
Patented May 17, 1955

2,708,521

STACKED DISC TYPE FLUID FILTER

Edward E. Saloum, Corry, Pa., assignor to Aero Supply Manufacturing Company, Inc., Corry, Pa., a corporation of New York Application June 14, 1954, Serial No. 436,574

3 Claims. (Cl. 210—183)

This invention relates in general to fluid filters and more particularly to improvements in fluid filters of the type employing a housing with an inlet and an outlet and in which housing is removably deposited a cartridge type filter unit comprising a plurality of filter discs and gaskets arranged in such a manner as to not only filter the fluid but also to provide a tortuous passageway for the fluid for fluid filtering before the fluid is discharged through the outlet.

One of the primary objects of the invention is to provide in a fluid filter of this type an improved type of filter disc that is relatively rigid, flat and thin, and which employs a fine mesh screen, as distinguished from a fibre filter disc.

Another object is to provide a filter disc that is relatively thin and rigid, and which employs a fine mesh screen on both sides of the disc so as to also retain and house a quantity of fine pellets, preferably of non-corrosive material, so as to augment the filtering characteristics of the screens.

Another object is to provide a fluid filter cartridge that employs such filter discs that are arranged alternately between two types of fluid directing gaskets, one of which types is webbed with a solid center and radially outwardly extending ribs to admit fluid entry peripherally to provide longitudinal channels between the ribs so as to constitute an intake gasket and the other type gasket webbed with a solid periphery with radially inwardly extending ribs to provide longitudinal channel to constitute a drainage gasket, so as to provide not only a tortuous fluid passage but maximum fluid engagement with the alternately arranged filter discs as the fluid is deflected alternately inwardly and outwardly by the inlet and drainage gaskets.

A further object of the invention is to provide the cartridge with longitudinally extending mounting and disc and gasket retaining rods and to provide the gasket ribs with holes to receive the rods for alignment purposes.

A further object is to form the filter disc with both a peripheral and an outer wall with internal ribs between the two walls to divide the filter disc into a number of divided compartments for retaining the filtering pellets to insure proper equal distribution within the disc between its two screens.

A further object is to provide some of the disc ribs with rod holes to insure proper alignment of the discs in their alternate disposition with respect to the alternate inlet and drainage gaskets.

With the foregoing and other objects in view, the invention resides in the combination of parts and in the details of construction hereinafter set forth in the following specification and appended claims, certain embodiments thereof being illustrated in the accompanying drawings, in which:

Figure 2 is a plan view of the skeleton framework of one of the fluid filter discs without the fluid filter pellets or the screens secured thereto;

Figure 4 is a plan view of one of the drainage gaskets;

Figure 5 is a plan view of one of the inlet gaskets; and

Figure 6 is a fragmentary view in vertical section taken through a portion of the fluid filter cartridge, showing the fluid filter discs to have fluid filter pellets disposed between the screens on either side of the disc, and also showing the alternate arrangement of the fluid filter discs and the inlet gaskets and outlet gaskets.

Figure 1:
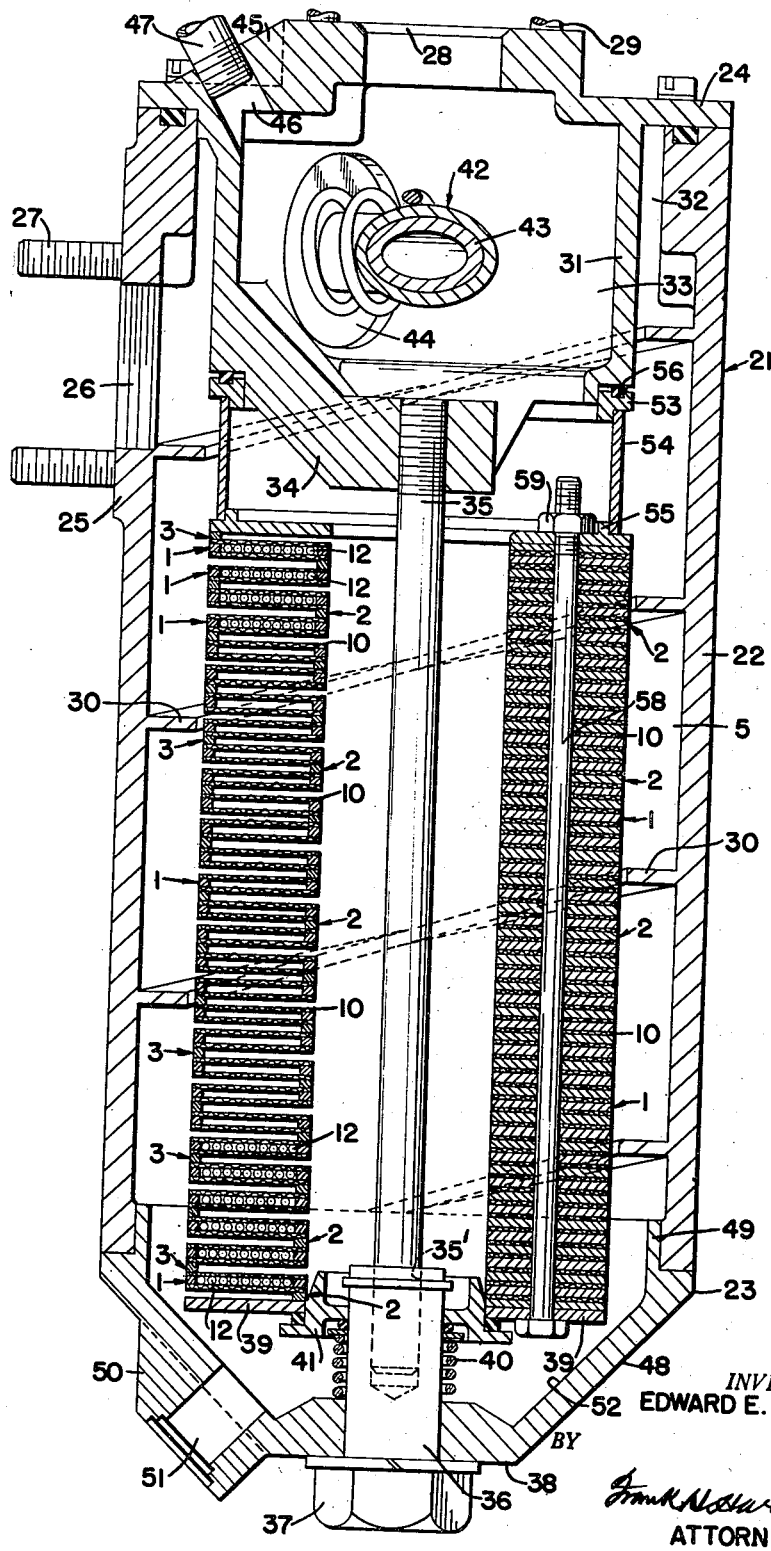
Figure 1 is a view in vertical section taken through my improved fluid filter with the stacked disc type of fluid filter cartridge.

Referring more particularly to the drawings, as a means of illustration of one environment in which my invention has particular adaptability and utility, I have illustrated a fluid filter casing similar to that disclosed in United States Letters Patent to George T. Downey et al., 2,638,228, for Fluid Filter, May 12, 1953, and I have replaced the cylindrical filter element therein with my present improved new and novel fluid filter cartridge unit.

This being the case, I will first direct attention to a description of the elements of the cartridge including the filter disc and the inlet and drainage gaskets. In Figures 2 and 3, I generally designate the filter disc at 1. In Figure 5, I generally designate the inlet gasket at 2. In Figure 4, I generally designate the drainage gasket at 3.

In Figure 3, I have shown the internal structural framework of the filter disc to comprise a peripheral wall 4, an internal wall 5 and nine radial ribs 6 joining the two to form nine separate compartments 7. I have shown three of these ribs widened at 8 to include a positioning rod hole 9. This filter disc framework is preferably of rigid material. To both sides of the filter disc framework I securely fasten a fine mesh screen 10, leaving three holes 11 therein to be in alignment with holes 9 to receive positioning rods, later to be described. After one screen has been applied to one side of the filter disc framework, and before the other screen is secured, I deposit equal quantities of fine pellets of non-corrosive material, such as glass, or the like, after which I secure the other screen on the other side. I have shown such pellets at 12 in Figure 6 in exaggerated proportional size, with respect to the two screens 10, one on each side of the filter disc framework. I have found that such a filter disc assembly in which the framework is structurally divided into compartments enhances the equal distribution of the filtering pellets. I have also found that the combination of such an arrangement with the two screen walls that enclose the pellets makes for a highly efficient fluid filter disc.

The fluid inlet gasket 2 includes an inner wall 13, from which radially outwardly extend nine ribs 14, there being no outer wall comparable to outer wall 7 of the filter disc 1. Three of these ribs 14 are shown widened at 15 to have holes 16 to be aligned with rod receiving holes 9 in the filter disc. The gasket 2 may be made of fibre.

In Figure 4, I have shown the fluid drainage gasket, which may be made of fibrous material, to comprise an outer wall 17, comparable to outer wall 4 of the filter disc 1, and nine radially inwardly extending ribs 18, but with no inner wall, such as inner walls 5 and 13 of the filter disc 1 and fluid inlet gasket 2. Three of the ribs 18 are widened at 19 to have holes 20 to be aligned with holes 9 and 16 of the filter disc 1 and fluid inlet disc 2.

Referring to Figure 1 of the drawings, the numeral 21 designates generally a housing formed of a cylindrical side wall 22, a lower head 23, and an upper head 24. The side wall 22 has disposed adjacent the upper portion thereof a suitable boss 25 formed with an intake port 26 and a plurality of bolts 27 are threaded into the boss so that a fluid supply line may be coupled to the intake boss.

The upper head 24 is formed with an outlet port 28. A plurality of upstanding bolts 29 provide a means whereby a fluid line may be coupled to the outlet 28 of the fluid filter unit structure. The cylindrical side wall 22 may have secured to the inner side therof a spirally disposed vane 30, the purpose for which will be hereinafter described. A depending housing 31 is fixed to and depends from the inner side of the upper head 24 and divides the upper portion of the housing 21 into an inlet chamber 32 and an outlet chamber 33.

The housing 31 has disposed centrally thereof and in downwardly offset position a bracket 34. A bolt 35 is threaded into the bracket 34 and extends centrally and downwardly through the housing 22. A sleeve 36 is threaded on the lower end of bolt 35 and a nut 37 is carried by the lower end of the sleeve 36 so as to abut against the bottom wall 38 of the lower head 23.

A circular plate 39 is loosely disposed about the sleeve 36. A spring 40 is interposed between the bottom wall 38 and the plate 39 so as to yieldably hold a collar 41, surrounding sleeve 36, into engagement with plate 39. The sleeve 36 is provided with a socket 35' to loosely receive the lower end of bolt 35 to permit relative vertical adjustment.

As is the case in the aforesaid patent, the housing 31 may have disposed therein an overload, or relief, valve structure generally designated as 42, and including a sleeve 43 carried by a plate 44 secured to the housing 31. The sleeve 43 forms a guide and projects through a suitable opening formed in the housing 31. The upper head 24 has extending angularly therefrom a boss 45 formed with a port 46 communicating with the outlet chamber 33. A straight threaded fitting 47 may be threaded into the boss 45 to connect to a suitable outlet pressure indicating meter.

The lower head 23 is formed with a truncated conical wall 48 which includes an annular flange 49 telescoping within the lower end of the side wall 22. A boss 50 is carried by the lower wall 48 and is formed with a drain opening 51 within which a suitable drain plug is adapted to be normally disposed. The chamber 52 within the lower head 23 below the plate 39 forms a sump, or collector, within which water, dirt, dust, or solid particles are adapted to be collected.

Beneath the hollow cylindrical wall 31 is disposed a ring 53, supported by a hollow cylindrical wall 54 that rests on a hollow plate 55, a sealing ring 56 being disposed between wall 31 and ring 53. As will now be explained, plate 55 is the top plate and plate 39 is the bottom plate, between which my improved filter cartridge, comprising the filter discs and inlet and drainage gaskets, is disposed and held in aligned position by three tie rods 58 that extend through rod holes 9, 16 and 20 of the filter disc 1, the inlet gasket 2 and the drainage gasket 3, respectively. The rods 58 are threaded at their upper ends to receive nuts 59 for adjusting the compression on the stack of filter discs and gaskets.

My preferred arrangement of the filter discs and gaskets, as shown in Figure 1, is to first place an inlet gasket 2 on the bottom plate 39. Then, I superimpose a filter disc 1 on the bottom inlet gasket 2. Then, on this inlet gasket 2, I place another filter disc 1 and on this filter disc 1, I place a drainage gasket 3, upon which I place another filter disc 1. I carry on this sequence of building up the filter cartridge from bottom to top so that the bottom element is an inlet gasket 2 and the top element is a drainage gasket 3. In other words, there is disposed only one gasket between each pair of filter discs and these gaskets are alternated in kind with respect to each other in the stack. Likewise, there is disposed only one filter disc between each adjacent inlet and drainage gasket.

I have found that such a combination and arrangement makes for such a tortuous fluid flow, first between the ribs 14 of the inlet gasket 2 until it is blocked by the inner wall 13, thence through the screens and filter pellets of my highly efficient filter disc 1 and thence between the ribs 18 of my drainage gasket 3 until it hits the center wall 17, and thence through another filter disc, and so on. As stated before, although this flow is tortuous, it is not unduly impeded because the alignment of the ribs 6, 14 and 18 is assured by the rods 56 passing through the holes 9, 16 and 19. Moreover, it provides for maximum flow area through the filter discs as the flow is deflected alternately in opposite directions by the inlet and outlet gaskets.

In the use and operation of this fluid filter, the intake 20 is supplied by a source of fluid pressure, and the outlet 28 may lead, for instance, to a source of fluid consumption, such as an internal combustion engine, or the like. The upper head 24 is so mounted on the housing or side wall 21 that the pressure relief valve structure 42 will be disposed at a point remote from the intake port 26. In this manner, the incoming pressure force will not be applied directly to the relief valve and thereby cause the relief valve to move to open position before a predetermined excess pressure differential is built between the inlet and outlet chambers 32 and 33. The fluid entering the intake chamber 32 will be given a spiral movement downwardly in the filter chamber 58.

This filter structure will provide a means whereby fluid, such as gas or air or liquid, such as gasoline, oil, water, or the like, will be thoroughly filtered and the construction of the filter unit is such that the dirt particles will be carried downwardly into the sump 52. Fluid flow through the stack of alternately arranged filter discs and inlet and drainage gaskets will have the effect of maintaining the filter cartridge in a relatively clean condition. The elements of the filter cartridge may be washed by a localized fluid pressure blast which will displace the pellets, spheres or balls of the filter discs sufficiently to allow dirt to be blown through the elements of the filter cartridge. The degree of filtration can be regulated or controlled by varying the mesh of the screens of the filter discs and the diameters of the pellets, balls, or spheres, which are positioned between the screens of the filter discs. The assembly of the elements of the filter cartridge is simple, as is its installation in and removal from the fluid filter housing.

I claim:

1. In a fluid filter having a housing with an inlet and an outlet, a fluid filter cartridge adapted for removable installation in the housing, a plurality of rods extending longitudinally of the housing, a plurality of fluid filter discs, each of which comprises a rigid flat member having an inner wall and a peripheral wall, a filter screen secured to both of the opposite faces of said filter discs and a plurality of fine filter pellets disposed therebetween, a plurality of fluid inlet gaskets each having an inner solid wall and radially outwardly extending ribs, a plurality of fluid drainage gaskets each having a solid peripheral wall and radially inwardly extending ribs, said discs and gaskets being so arranged that said discs are disposed alternately with respect to said inlet and drainage gaskets and said inlet and drainage gaskets are disposed alternately with respect to said discs.

2. In a fluid filter having a housing with an inlet and an outlet, a fluid filter cartridge adapted for removable installation in the housing, a plurality of rods extending longitudinally of the housing, a plurality of fluid filter discs, each of which comprises a rigid flat member having an inner wall and a peripheral wall and radiating ribs therebetween to divide the same into a plurality of separate compartments, a filter screen secured to both of the opposite faces of said filter discs, and a plurality of fine filter pellets disposed in each of said compartments, a plurality of fluid inlet gaskets each having an inner solid wall and radially outwardly extending ribs, a plurality of fluid drainage gaskets each having a solid peripheral wall and radially inwardly extending ribs, said discs and gaskets being so arranged that said discs are disposed alternately with respect to said inlet and drainage gaskets and said inlet and drainage gaskets are disposed alternately with respect to said discs.

3. In a fluid filter having a housing with an inlet and an outlet, a fluid filter cartridge adapted for removable installation in the housing, a plurality of rods extending longitudinally of the housing, a plurality of fluid filter discs, each of which comprises a rigid flat member having an inner wall and a peripheral wall and radiating ribs therebetween to divide the same into a plurality of separate compartments, a filter screen secured to both of the opposite faces of said filter discs and a plurality of fine filter pellets disposed in each of said compartments, a plurality of fluid inlet gaskets each having an inner solid wall and radially outwardly extending ribs, a plurality of fluid drainage gaskets each having a solid peripheral wall and radially inwardly extending ribs, some of the ribs of said discs and gaskets having holes therein to receive said rods for alignment purposes, said discs and gaskets being so arranged that said discs are disposed alternately with respect to said inlet and drainage gaskets and said inlet and drainage gaskets are disposed alternately with respect to said discs.

References Cited in the file of this patent

UNITED STATES PATENTS

| | | |
|---|---|---|
| 830,652 | Durbrow | Sept. 11, 1906 |
| 1,402,706 | Auberschek | Jan. 3, 1922 |
| 2,582,272 | Pamp | Jan. 15, 1952 |
| 2,638,228 | Downey et al. | May 12, 1953 |
| 2,639,036 | Humber et al. | May 19, 1953 |

FOREIGN PATENTS

| | | |
|---|---|---|
| 354,076 | Germany | June 1, 1922 |
| 574,597 | France | July 16, 1924 |
| 1,353 | Great Britain | of 1910 |